May 3, 1960     KANJI TAKEBA ET AL     2,935,513
CONTINUOUS PRODUCTION OF 2-METHYL-5-ETHYLPYRIDINE
Filed Sept. 10, 1957     2 Sheets-Sheet 1

K. TAKEBA
T. TERADA
T. SATO

*Inventors*

K. TAKEBA
T. TERADA
T. SATO
Inventors

2,935,513
CONTINUOUS PRODUCTION OF 2-METHYL-5-ETHYLPYRIDINE

Kanji Takeba, Osaka, Tanoshi Terada, Nishinomiya, and Tadao Sato, Osaka, Japan, assignors to Takeda Pharmaceutical Industries, Ltd., Osaka, Japan Application September 10, 1957, Serial No. 683,160

5 Claims. (Cl. 260—290)

This invention relates to the continuous production of 2-methyl-5-ethylpyridine by the reaction of acetaldehyde with ammonia.

The condensation reaction of aldehydes with ammonia to synthesize substituted pyridines is one of the oldest organic reactions. According to this method, however, there are formed mixtures of various pyridine derivatives and by-products so that the yield of a desired single pyridine is poor.

Frank et al. (J. Am. Chem. Soc., vol. 68, p. 1368 (1946)) obtained 2-methyl-5-ethylpyridine with the yield of about 70% by reacting paraldehyde with a large excess of aqueous ammonia (about 10 times the theoretical amount). However, this was a batch process so that the use of such a large excess of aqueous ammonia caused increase in volume of a pressure-resistant reaction vessel. In addition, it was necessary to use a reaction vessel having pressure resistance considerably higher than that required in case where a less amount of ammonia is used. Therefore, the discovery was unable to be fully satisfactorily put into practice. If, in this method, the amount of aqueous ammonia is decreased to about 3.7 times the theoretical amount to reduce the volume of the reaction mixture the yield is lowered to 50% (Frank, Org. Synth., vol. 30, pp. 41–43 (1950)).

In British Patent No. 534,494, there is described a method of the continuous production of 2-methyl-5-ethylpyridine by the reaction of paraldehyde with aqueous ammonia. According to this method, paraldehyde to which is added oleic acid as an emulsifying agent is mixed with aqueous ammonia (about 1.5 times the theoretical amount) and the mixture is passed through a steel coil heated at 220° C. and maintained at about 60 atmospheric pressure to obtain 2-methyl-5-ethylpyridine with the yield of 51%.

It has further been proposed in British Patent No. 742,268 to make 2-methyl-5-ethylpyridine by mixing ammonia and paraldehyde at a molar ratio of 7.5 mols. to 1.0 mol. together with 2.4% (about 10% based upon the amount of paraldehyde) of ammonium acetate, and passing the mixture for the residence time of about 10 minutes through a pressure-resistant stainless steel tube within which the temperature was maintained between 255° and 265° C. while the pressure was maintained between 1650 and 1850 lbs. per sq. in.

Under the conditions given in both of the above mentioned British patents, the reactants are all in the liquid phase.

According to the present invention, a continuous process for making 2-methyl-5-ethylpyridine by reacting a mixture of paraldehyde and aqueous ammonia in the presence of a catalyst at an elevated temperature and pressure and in the liquid phase, comprises continuously feeding the said reaction mixture from the bottom of a pressure-resistant vertical cylindrical reaction tower (hereinafter called reactor) in which are provided or filled obstacles and passing such mixture through said tower upwardly. The reaction zone is maintained preferably between 190° and 250° C. and at a pressure to maintain the reactants or the mixture in the liquid phase.

Although the concentration of the aqueous ammonia to be used may be varied widely, the range of 15–30% is satisfactory for industrial purpose because if the concentration is lower than 15% it would cause decrease in the yield and unduly increase in the volume of the reaction mixture, while if the concentration exceeds the said range it would cause difficulties of the reaction under the usual pressures and necessity of higher pressure. According to this invention, the use of a large excess of ammonia is unnecessary and the molar ratio of ammonia to paraldehyde may be at least about 1.5 to 1.0.

We have found that when the reaction mixture is passed down through the same reactor under the same conditions as those in the present invention the resulting products contain various resinous substance having high boiling points and the yield of the desired substituted pyridine is very poor. It is believed that this is caused by the fact (our findings) that under the normal temperature the phase of aqueous ammonia of the concentration (about 15–30%, sp. gr. $D_4^{20°}=0.943–0.892$) suitable for the reaction floats on the phase of paraldehyde (sp. gr. $D_4^{20°}=0.994$) but under the elevated reaction temperature the relative position of the two phases is reversed.

As for the obstacles to be provided or filled in the vertical cylindrical reactor, any means well known to those skilled in the chemical engineering field to obstruct the flow of fluid may be used. For example, a filler such as of Raschig ring, Berl-saddle, wire netting; and provision of perforated plates or racks may be used.

A single reactor may be used, but it is preferable to use a series of such reactors so that the reaction mixture is passed successively through the plurality of reactors in the manner described. In other words, the reaction mixture is fed to the bottom of the first reactor, passed therethrough upwardly, then further fed to the bottom of the subsequent reactor and passed therethrough upwardly.

It has further been found that if pulsation is imparted to the reaction mixture in the reactor the reaction mixture is satisfactorily emulsified so that the reaction is more effectively carried out. This is accomplished by communicating the bottom or top of the reactor with any suitable pulsator by which a portion of the reaction mixture is sucked, compressed and returned into the tower with the result that a pulsation is imparted to the reaction mixture. The pulsation preferably is of at least 0.4 mm. in amplitude and 100 cycles per minute in frequency.

Because of the provision of the obstacles in the reactor intimate contact between and dispersion of the reactants is effected, and furthermore emulsification of the reaction mixture is promoted by the pulsation. Therefore, without using a large excess of ammonia, the reaction proceeds smoothly and effectively. In addition, the linear speed of the reaction mixture passing through the reactor may be considerably lower than that required in the tube process (British patents referred to before) to sufficiently mix and disperse the reactants. The use of such a small amount of ammonia makes it possible to lower the reaction pressure (vapor pressure) as hereinafter exemplified so that the operation and control of the reaction are easy and the pressure resistance of the reactor may be low.

One of the important factors for the continuous production of 2-methyl-5-ethylpyridine is in easy maintenance of the proper reaction temperatures. According to this invention, since the linear speed of the reactants passing through the reactor may be low, it is possible to successively elevate the reaction temperature as the reaction proceeds. This is more satisfactorily accomplished by using a series of reactors. It will be understood that it is quite easy to keep the temperature of the second reactor higher than that of the first reactor. In this way, a rapid increase in the temperature by the heat of the reaction can be avoided and the heat of the reaction is uniformly distributed throughout the reaction zone so that the proper temperature can be maintained. In addition, the heat of the reaction can be utilized to save the thermal energy required to maintain the reactor or reaction tower at the selected temperature.

Another important factor in the continuous process is that take-out of the reaction product is effected easily and steadily. To maintain the reactants in the liquid phase, it is necessary to keep the pressure in the reaction tower at least at the saturated vapor pressure which is determined by the temperature of operation and the concentration of the reactants. Furthermore, it is necessary to continuously discharge the resulting reaction product in the amount corresponding to that of the charged reactants to keep the residence time of the reactants substantially as desired. To accomplish this the last reactor is provided with a suitable means to maintain the liquid level therein substantially within the desired range. In one embodiment, such means comprises a liquid level indicator operatively connected with a control valve adapted to control, in response to the level indicator, the flow-out of the liquid from the said reactor in such a manner that the liquid level in the reactor is maintained substantially within the desired range. Thus, so far as the reactants are charged constantly in a predetermined rate, a substantially constant or predetermined residence time is obtained even when the vapor pressure is changed by some reasons such as change in the temperature and/or concentration.

It has been found that a residence time in the reaction zone is preferable to be between about 60 and 230 minutes.

Any known catalyst such as ammonium acetate, ammonium salts of other organic acids, ammonium chloride, ammonium carbonate, sodium acetate, sodium carbonate, sodium fluoride, ammonium phosphate and other metal halides may be effectively used in the method of this invention. Almost all of these known catalysts, however, are corrosive against ordinary steel and therefore it is necessary to make the apparatus of a corrosion-proof material such as stainless steel which is difficult to work and is expensive. We have found that compounds of the metals belonging to group VI of the periodic table such as molybdic acid, tungstic acid and their salts are substantially not corrosive against ordinary steel and their catalytic action is comparable to the known catalysts. These compounds are soluble in aqueous ammonia and accordingly there is no danger that they clog the pipes, reactor, etc. of the apparatus. Since the catalyst remains dissolved in the excess or unreacted aqueous ammonia after the completion of the reaction, the recovered aqueous ammonia containing the catalyst, after replenishing its ammonia content, can be repassed to the reactor without supplementing fresh catalyst. Therefore, recovery of the catalyst is substantially theoretical. The amount of the catalyst to be used may be varied widely, but preferably within 3–10% based upon the weight of paraldehyde used.

The recovery of 2-methyl-5-ethylpyridine from the resulting reaction products is easily carried out by separating the oily layer containing the desired product from the aqueous ammonia layer and distilling the oily layer. If desired, the aqueous ammonia layer is extracted with chloroform or benzene to increase the degree of separation of the oily layer.

The invention will be more fully understood if the following description is read in connection with the annexed drawing in which.

Figure 1:
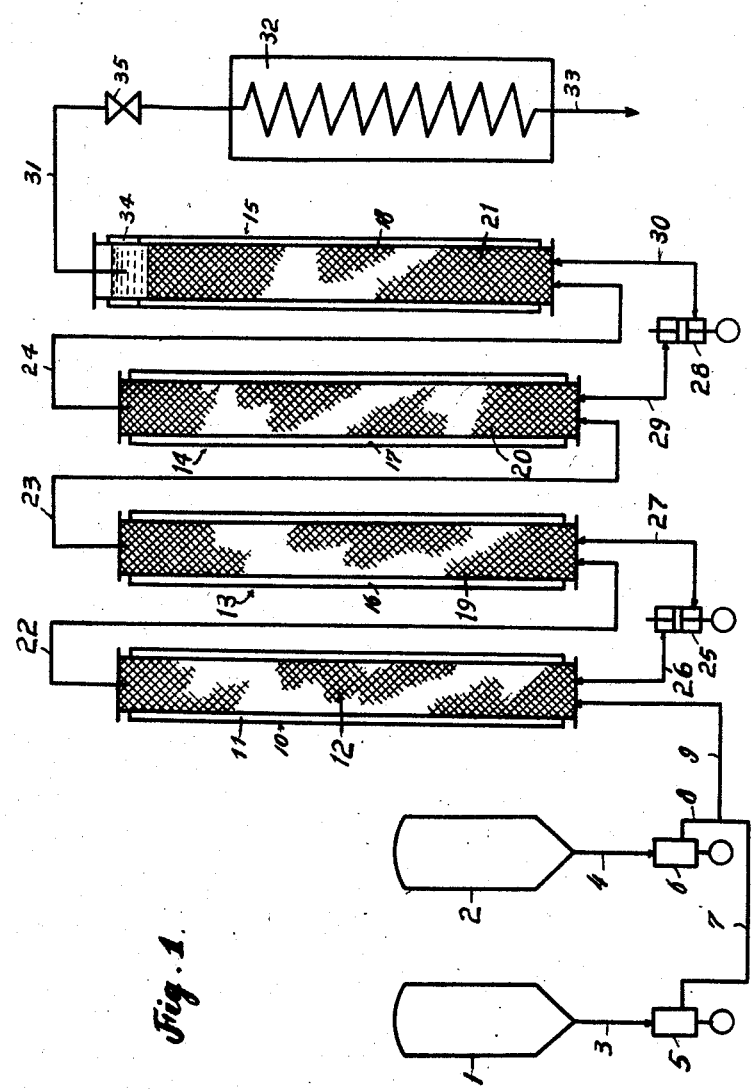
Fig. 1 is a schematic side view of an apparatus by which the method disclosed herein may be performed.

Referring to Fig. 1, the reference numerals 1 and 2 indicate reservoirs of paraldehyde and aqueous ammonia containing a catalyst respectively. When the catalyst to be used is an ammonium salt of an acid it is convenient to provide a reservoir of the acid from which a predetermined amount of the acid is continuously fed into the aqueous ammonia or mixture of aqueous ammonia and paraldehyde so that upon reaction of the acid with ammonia there is formed a predetermined amount of the catalyst.

Paraldehyde and aqueous ammonia at a predetermined rate are fed through tubes 3 and 4 into pressure pumps 5 and 6, respectively, from which the liquids are forced under pressure into respective tubes 7 and 8 and then put together in a tube 9. It is of course possible to provide a suitable mixer before the tube 9.

Indicated with the numeral 10 is a preheating tower provided with a heating means 11 and obstacle 12 therein as shown. Vertical cylindrical reaction towers or reactors 13, 14 and 15 are provided with heating means 16, 17 and 18 and obstacles 19, 20 and 21 (leaving a small space only in the last reactor 15 as shown) therein respectively. The said small space left in the last reactor 15 is to facilitate the measuring of the liquid level as explained later. The preheating tower 10 and the reactors 13, 14 and 15 are connected in series by tubes 22, 23 and 24 in such a way that the reaction mixture through the tube 9 is fed in the preheating tower 10 from its bottom, passed therethrough upwardly, discharged from its top and fed into the first reactor 13 from its bottom through the tube 22, passed through the first reactor upwardly, discharged from its top and fed into the second reactor 14 from its bottom through the tube 23, passed through the second reactor upwardly, discharged from its top and fed into the third or last reactor from its bottom through the tube 24 and passed through the third reactor upwardly.

A pulsator 25 is provided to impart pulsation to the reaction mixture in the towers 10 and 13 through tubes 26 and 27 respectively. Indicated with 28 is a similar pulsator to impart pulsation to the reaction mixture in the towers 14 and 15 through tubes 29 and 30 respectively. The pulsators may be, for example, of a reciprocation type.

In the course of passing through these reactors successively, the reaction is completed and the liquid reaction products are taken out of the last reaction tower 15 from a tube 31, passed through a cooler 32 and discharged to receiver (not shown) through a tube 33.

The last tower or reactor 15 is provided with a liquid level indicating means 34 operatively connected with a control valve 35 provided in the pipe line 31. For example, the liquid level indicating means 34 comprises a γ-ray producer (for example, a radio isotope such as Co⁶⁰) adapted to radiate γ-rays across the liquid level, a scintillation counter adapted to receive the γ-rays to indicate the liquid level. The valve 35 is so connected with the indicator 34 as to control the flow of the liquid reaction products in the tube 31 in response to the indicator to maintain the liquid level in the reactor 15 within the desired range.

Figure 2:
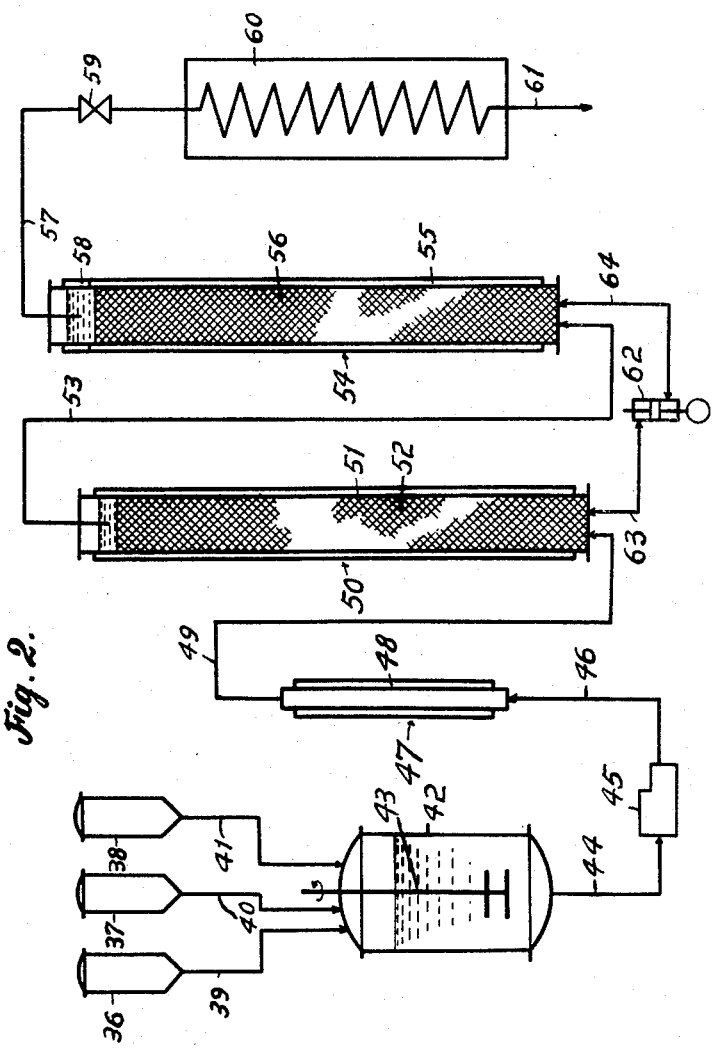
Fig. 2 is a similar view of another apparatus wherein two reaction towers or reactors connected in series are used.

In the apparatus shown in Fig. 2, there are provided reservoirs 36, 37 and 38 for paraldehyde, aqueous ammonia and catalyst, respectively. Paraldehyde, aqueous ammonia and catalyst are continuously fed, in predetermined proportions, through respective tubes 39, 40 and 41 into a mixing tank 42 provided with a stirrer 43. A reaction mixture is fed through a tube 44 in a pressure pump 45 and is fed, under pressure and through a tube 46, to a preheating tower 47 provided with a heating means 48 from its bottom. The reaction mixture is passed through the said tower upwardly, preheated therein and discharged from its top through a tube 49. The mixture is then fed through the tube 49 into a vertical cylindrical reaction tower or the first reactor 50 from its bottom and passed therethrough upwardly. The reactor 50 is provided with a heating means 51 and with obstacles 52. Then, the mixture is discharged from the top of the tower 50 through a tube 53 and fed into the second vertical cylindrical reaction tower or the second reactor 54 from its bottom. This reaction tower 54 is provided with a heating means 55 and obstacles 56 leaving a small space as shown. The reaction mixture passed through the second reactor 54 upwardly is discharged from its top by a tube 57. A liquid level indicating means 58, control valve 59, cooler 60, discharge tube 61, pulsator 62, tubes 63 and 64 are similar to those described in connection with Fig. 1 in structure and operation so that no additional explanation will be necessary.

Several examples to illustrate the actual means and results according to the invention are given hereinafter. It should, of course, be understood that these examples are illustrative only and are not to be taken as limiting the scope of our invention.

*Example 1*

An apparatus as shown in Fig. 1 was used. Each of the towers 10, 13, 14 and 15 was 13 cm. in the inside diameter and about 15 litres in volume. To provide the obstacles, each of the towers was substantially filled with wire-netting with the void space of 90%. Only in the last reactor 15 there was left a small space as shown. The preheating tower 10 was maintained at a temperature between 190° and 200° C., and the reactors 13, 14 and 15 were maintained at 190°–200° C., 200°–220° C. and 230°–250° C., respectively. The pulsation of 0.4 mm. in amplitude and 100 cycles per minute in frequency was imparted only to the reactors 14 and 15.

A mixture of 25% aqueous ammonia, containing $MoO_3$ (8% based upon the weight of paraldehyde used), and paraldehyde in a molar ratio of ammonia 1.5 to paraldehyde 1.0 was passed through the reaction system maintaining the total residence time in the reactors of 90 minutes. The pressure was 640–710 lbs. per sq. in.

After cooling the reaction product, the organic or oily layer was separated and dehydrated. The aqueous layer was extracted with benzene. The benzene extract was distilled to remove the solvent and the oily residue obtained was combined with the first organic layer. The combined liquid was rectified under the normal pressure, and the distillates evaporating between 175° and 180° C. were collected. By this way, 2-methyl-5-ethylpyridine (sp. gr. 0.920 at 20° C., $N_D^{20}$ 1.4970, B.P. 74–75° C./20 mm. Hg) was obtained in a yield of about 70%. The purity of the 2-methyl-5-ethylpyridine was more than 98.0% by standard methods of analysis.

*Example 2*

A mixture of 25% aqueous ammonia, containing $WO_3$ (8% based upon the weight of paraldehyde used), and paraldehyde in a molar ratio of ammonia 2.25 to paraldehyde 1.0 was passed to the reaction system under the condition as described in Example 1 except that the pulsation was imparted only to the preheating tower 10 and the first reactor 13. The total residence time of the reaction mixture in the reactors was maintained about 60 minutes and the pressure was 780–850 lbs. per sq. in.

After working the reaction product as described in Example 1, 2-methyl-5-ethylpyridine was obtained in about the same yield and purity as outlined in Example 1.

We claim:

1. A process for continuously preparing 2-methyl-5-ethylpyridine which comprises continuously passing a mixture of paraldehyde and aqueous ammonia and containing a catalyst selected from the group consisting of molybdic acid, tungstic acid and salts of said acids upwardly through a vertically elongated reaction zone maintained at a temperature in the range of 190° to 250° C. and at a pressure sufficient to maintain the reaction mixture in liquid phase, and at the same time imparting a pulsation to the reaction mixture in the reaction zone to promote emulsification of the reaction mixture.

2. A process according to claim 1 wherein the pulsation is at least 0.4 mm. in amplitude and 100 cycles per minute in frequency.

3. A process according to claim 1 wherein the reaction mixture contains at least 1.5 mols of ammonia for each mol of paraldehyde.

4. A process according to claim 1 wherein the residence time of the reaction mixture in the reaction zone is between 60–230 minutes.

5. A process according to claim 1 wherein the catalyst is between 3 and 10% by weight based upon paraldehyde used.

References Cited in the file of this patent

UNITED STATES PATENTS

| | | |
|---|---|---|
| 338,557 | Ritter et al. | Mar. 23, 1886 |
| 2,605,264 | Hoog et al. | July 29, 1952 |
| 2,618,534 | Mrstik | Nov. 18, 1952 |
| 2,742,474 | Mahan | Apr. 17, 1956 |
| 2,749,348 | Mahan et al. | June 5, 1956 |

OTHER REFERENCES

Sage et al.: Chem. Eng. Progress, Symposium Series, vol. 50, No. 8, August, 1954, pp. 396–402.

UNITED STATES PATENT OFFICE
CERTIFICATION OF CORRECTION

Patent No. 2,935,513                                            May 3, 1960

Kanji Takeba et al.

It is hereby certified that error appears in the above numbered patent requiring correction and that the said Letters Patent should read as corrected below.

In the heading to the printed specification, between lines 7 and 8, insert the following:

Claims priority, application Japan September 27, 1956

Signed and sealed this 2nd day of May 1961.

(SEAL)
Attest:

ERNEST W. SWIDER                                      DAVID L. LADD
Attesting Officer                                         Commissioner of Patents